US012289592B2

(12) United States Patent
Wang et al.

(10) Patent No.: US 12,289,592 B2
(45) Date of Patent: Apr. 29, 2025

(54) ACOUSTIC OUTPUT APPARATUS

(71) Applicant: SHENZHEN SHOKZ CO., LTD., Guangdong (CN)

(72) Inventors: Liwei Wang, Shenzhen (CN); Lei Zhang, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 205 days.

(21) Appl. No.: 18/064,942

(22) Filed: Dec. 13, 2022

(65) Prior Publication Data

US 2023/0111069 A1 Apr. 13, 2023

Related U.S. Application Data

(63) Continuation of application No. PCT/CN2020/137595, filed on Dec. 18, 2020.

(51) Int. Cl.
*H04R 9/06* (2006.01)
*H04R 1/02* (2006.01)
*H04R 1/34* (2006.01)
*H04R 7/04* (2006.01)
*H04R 9/02* (2006.01)

(52) U.S. Cl.
CPC ............... *H04R 9/06* (2013.01); *H04R 1/023* (2013.01); *H04R 1/345* (2013.01); *H04R 7/04* (2013.01); *H04R 9/025* (2013.01); *H04R 2201/00* (2013.01)

(58) Field of Classification Search
None
See application file for complete search history.

(56) References Cited

U.S. PATENT DOCUMENTS 4,429,194 A 1/1984 Kamon et al.
6,134,336 A 10/2000 Clark
(Continued)

FOREIGN PATENT DOCUMENTS

CL 199601043 A1 2/1997
CN 105142077 A 12/2015
(Continued)

OTHER PUBLICATIONS

International Search Report in PCT/CN2020/137595 mailed on Sep. 26, 2021, 8 pages.
(Continued)

*Primary Examiner* — Paul W Huber
(74) *Attorney, Agent, or Firm* — METIS IP LLC

(57) ABSTRACT

The present disclosure discloses an acoustic output apparatus. The acoustic output apparatus may include at least one acoustic driver, a housing structure, and at least two sound guide holes. The at least one acoustic driver may output sounds having opposite phases from the at least two sound guide holes. The housing structure may be configured to carry the at least one acoustic driver. The housing structure may include a user contact surface to be in contact with a user. When the user wears the acoustic output apparatus, the user contact surface may be in contact with a body of the user. An included angle between a connection line between the at least two sound guide holes and the user contact surface may be in a range of 75°-105°.

20 Claims, 10 Drawing Sheets

1300

(56) References Cited

U.S. PATENT DOCUMENTS

| | | | |
|---|---|---|---|
| 9,100,732 | B1 | 8/2015 | Dong et al. |
| 2005/0105755 | A1 | 5/2005 | Yueh |
| 2010/0080400 | A1 | 4/2010 | Sibbald et al. |
| 2013/0051585 | A1 | 2/2013 | Karkkainen et al. |
| 2013/0142376 | A1 | 6/2013 | Lin |
| 2014/0185822 | A1 | 7/2014 | Kunimoto et al. |
| 2015/0264488 | A1 | 9/2015 | Onishi |
| 2016/0329041 | A1 | 11/2016 | Qi et al. |
| 2017/0201823 | A1 | 7/2017 | Shetye et al. |
| 2018/0048960 | A1 | 2/2018 | Jeffery et al. |
| 2020/0336824 | A1 | 10/2020 | Zheng et al. |
| 2021/0092525 | A1 | 3/2021 | Zheng et al. |
| 2022/0295167 | A1 | 9/2022 | Xu et al. |

FOREIGN PATENT DOCUMENTS

| | | | | |
|---|---|---|---|---|
| CN | 107295445 | A | | 10/2017 |
| CN | 109121038 | A | | 1/2019 |
| CN | 209710309 | U | | 11/2019 |
| CN | 110568633 | A | * | 12/2019 |
| CN | 211406274 | U | | 9/2020 |
| WO | 2004052050 | A1 | | 6/2004 |
| WO | 2019192808 | A1 | | 10/2019 |

OTHER PUBLICATIONS

Written Opinion in PCT/CN2020/137595 mailed on Sep. 27, 2021, 6 pages.

Notice of Reasons for Rejection in Japanese Application No. 2023511847 mailed on Apr. 1, 2024, 5 pages.

The Office Action in Russian Application No. 2022134296 mailed on Apr. 5, 2023, 14 pages.

The Extended European Search Report in European Application No. 20965608.1 mailed on Jul. 26, 2023, 12 pages.

* cited by examiner

1200

ACOUSTIC OUTPUT APPARATUS

CROSS-REFERENCE TO RELATED APPLICATIONS

This application is a continuation of International Application No. PCT/CN2020/137595, filed on Dec. 18, 2020, the entire contents of which are hereby incorporated by reference.

TECHNICAL FIELD

The present disclosure relates to the acoustic field, and in particular, to acoustic output apparatuses.

BACKGROUND

An open binaural acoustic output apparatus is a portable audio output apparatus that facilitates sound conduction within a specific range. Compared with conventional in-ear and over-ear earphones, the open binaural acoustic output apparatus may have the characteristics of not blocking and not covering the ear canal, which enable users to obtain sound information of the ambient environment while listening to music, and improve the safety and comfort of the user. Due to the use of an open structure, a sound leakage of the open binaural acoustic output apparatus may be more serious than that of a conventional earphone. At present, the open binaural acoustic output apparatus may have problems with insufficient sound loudness and relatively serious sound leakage.

Therefore, it is desirable to provide a more effective acoustic output apparatus, which can increase a listening volume of a user and reduce sound leakage.

SUMMARY

Some embodiments of the present disclosure provide an acoustic output apparatus. The acoustic output apparatus may include: at least one acoustic driver, wherein the at least one acoustic driver generates sounds having opposite phases, and the sounds with opposite phases radiate outward from at least two sound guide holes, respectively; and a housing structure configured to carry the at least one acoustic driver and including a user contact surface, wherein when a user wears the acoustic output apparatus, the user contact surface is configured to be in contact with a body of the user. An included angle between a connection line of the at least two sound guide holes and the user contact surface may be in a range of 75° to 90°.

In some embodiments, the at least two sound guide holes may include a first sound guide hole and a second sound guide hole. A distance from the first sound guide hole to the user contact surface may be smaller than a distance from the second sound guide hole to the user contact surface.

In some embodiments, the distance from the first sound guide hole to the user contact surface may be smaller than or equal to 5 mm.

In some embodiments, the distance from the first sound guide hole to the user contact surface may be smaller than or equal to 2 mm.

In some embodiments, a distance between the first sound guide hole and the second sound guide hole may be smaller than or equal to 2 mm.

In some embodiments, the distance between the first sound guide hole and the second sound guide hole may be smaller than or equal to 0.5 mm.

In some embodiments, the at least one acoustic driver may include a diaphragm and a magnetic circuit structure. A side of the diaphragm facing away from the magnetic circuit structure may form a front side of the at least one acoustic driver. A side of the magnetic circuit structure facing away from the diaphragm may form a rear side of the at least one acoustic driver. The diaphragm may vibrate to make the at least one acoustic driver radiate sounds outward from the front side and the rear side of the at least one acoustic driver, respectively.

In some embodiments, the at least one acoustic driver may include a first acoustic driver and a second acoustic driver. The first acoustic driver may include a first diaphragm. The second acoustic driver may include a second diaphragm. A sound generated by the vibration of the first diaphragm and a sound generated by the vibration of the second diaphragm may have opposite phases. The sounds generated by the vibration of the first diaphragm and the second diaphragm may radiate outward from the at least two sound guide holes, respectively.

In some embodiments, a damping layer may be provided on the at least two sound guide holes.

In some embodiments, the damping layer may be a metal filter mesh or a gauze mesh.

Other embodiments of the present disclosure provide an acoustic output apparatus. The acoustic output apparatus may include at least one acoustic driver, wherein the at least one acoustic driver generates sounds having opposite phases, and the sounds with opposite phases radiate outward from at least two sound guide holes, respectively; and a housing structure configured to carry the at least one acoustic driver and including a user contact surface, wherein when a user wears the acoustic output apparatus, the user contact surface is configured to be in contact with a body of the user. An included angle between a connection line of the at least two sound guide holes and the user contact surface may be in a range of 0° to 15°.

In some other embodiments, the at least two sound guide holes may include a first sound guide hole and a second sound guide hole, and a distance from the first sound guide hole or the second sound guide hole to the user contact surface may be smaller than or equal to 5 mm.

The distance from the first sound guide hole or the second sound guide hole to the user contact surface may be smaller than or equal to 2 mm.

In other embodiments, a distance between the first sound guide hole and the second sound guide hole may be smaller than or equal to 2 mm.

In other embodiments, the distance between the first sound guide hole and the second sound guide hole may be smaller than or equal to 0.5 mm.

In other embodiments, the at least one acoustic driver may include a diaphragm and a magnetic circuit structure. A side of the diaphragm facing away from the magnetic circuit structure may form a front side of the at least one acoustic driver. A side of the magnetic circuit structure facing away from the diaphragm may form a rear side of the at least one acoustic driver. The diaphragm may vibrate to make the at least one acoustic driver radiate sounds outward from the front side and the rear side of the at least one acoustic driver, respectively. In other embodiments, the at least one acoustic driver may include a first acoustic driver and a second acoustic driver. The first acoustic driver may include a first diaphragm. The second acoustic driver may include a second diaphragm. A sound generated by the vibration of the first diaphragm and a sound generated by the vibration of the second diaphragm may have opposite phases. The sounds generated by the vibration of the first diaphragm and the second diaphragm may radiate outward from the at least two sound guide holes, respectively.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
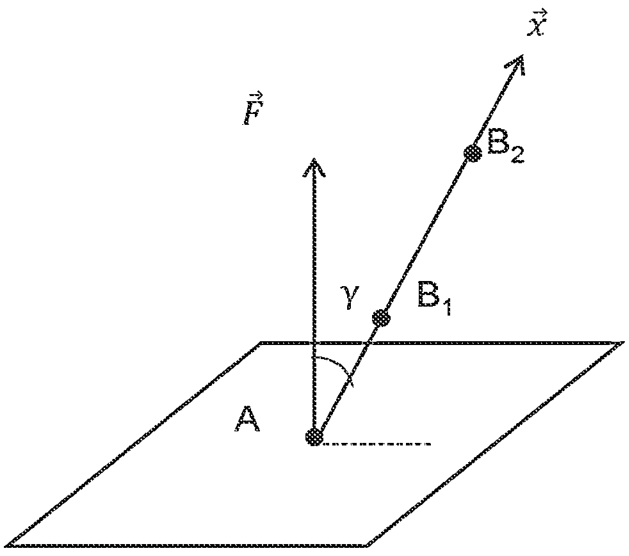
FIG. 1 is a schematic diagram illustrating two sound guide holes and a user contact surface of a housing structure according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

In some embodiments, the acoustic output apparatus may include an acoustic driver and a housing structure. The acoustic driver may be disposed inside the housing structure. A sound generated by at least one acoustic driver in the acoustic output apparatus may be propagated outward through at least two sound guide holes acoustically coupled with the at least one acoustic driver. In some embodiments, the two sound guide holes that are acoustically coupled with a same acoustic driver may be distributed on a same side of a head or a face of a user. In this case, the head or the face of the user may be approximately regarded as a baffle. The baffle may reflect the sound emitted from the two sound guide holes. In space, the sound reflected by the baffle may interfere with the sound directly radiated by each of the two sound guide holes, thereby changing an amplitude of the sound transmitted by the acoustic output apparatus to a specific position. In some embodiments, by designing a distance and an angle between the sound guide hole and the head or the face of the user, the sound generated by the acoustic output apparatus in a surrounding environment may have a relatively small amplitude, thereby reducing sound leakage of the acoustic output apparatus in the surrounding environment and also preventing the sound generated by the acoustic output apparatus from being heard by others near the user.

The present disclosure provides an acoustic output apparatus. In some embodiments, the acoustic output apparatus may be combined with a product such as a pair of glasses, a headset, a head-mounted display device, an AR/VR helmet, etc. In this case, the acoustic output apparatus may be fixed near the user's ear via a hanging manner or a clamping manner. When the user wears the acoustic output apparatus, the acoustic output apparatus may be disposed at least on one side of the head of the user, close to but not blocking the ear of the user. In some alternative embodiments, an outer surface of the acoustic output apparatus may include a hook, and the shape of the hook may match a shape of an auricle, so that the acoustic output apparatus may be independently worn on the ear of the user through the hook. The acoustic output apparatus worn on the ear of the user independently may communicate with a signal source (e.g., a computer, a mobile phone, or other mobile devices) in a wired or wireless (e.g., Bluetooth) manner. For example, the acoustic output apparatus worn at the left ear and/or right ear may directly communicate with the signal source in a wireless manner. As another example, the acoustic output apparatus worn at the left and/or right ear may include a first output device and a second output device. The first output device may communicate with the signal source, and the second output device may communicate with the first output device in a wireless manner. Audio may be playback synchronously between the first output device and the second output device through one or more synchronization signals. The wireless manner may include, but is not limited to, Bluetooth, a local area network, a wide area network, a wireless personal area network, a near-field communication, or the like, or any combination thereof. The acoustic output apparatus may be worn on the head of the user (e.g., an open earphone worn as glasses, a headband, or other structures, which is not placed in the ear), or worn on other body parts of the user (e.g., the neck, the shoulder, or a face area of the user), or placed near the ear of the user via other manners (e.g., via a hand-holding manner). At the same time, the acoustic driver may be close to but not block an ear canal of the user, so that the ear of the user may be in an open state. The user may not only hear the sound output by the acoustic output apparatus, but also obtain the sound of an external environment. For example, the acoustic output apparatus may be arranged around or partially around the ear of the user and may transmit the sound via an air conduction manner or a bone conduction manner.

An acoustic driver may be a component configured to receive an electrical signal and convert the electrical signal into a sound signal which may be output. In some embodiments, if divided according to the frequency of the acoustic driver, a type of the acoustic driver may include an acoustic driver with a low-frequency (e.g., 30 Hz-150 Hz), an acoustic driver with a middle-low-frequency (e.g., 150 Hz-500 Hz), an acoustic driver with a middle-high-frequency (e.g., 500 Hz-5 kHz) acoustic driver, an acoustic driver with a high-frequency e.g., 5 kHz-16 kHz), an acoustic driver with a full-frequency (e.g., 30 Hz-16 kHz), or the like, or any combination thereof. The low-frequency, the high-frequency, etc., mentioned here may be merely used to indicate an approximate range of the frequency. In different application scenarios, the frequency may be divided in different manners. For example, a frequency division point may be determined. The low-frequency may indicate a frequency range that is smaller than the frequency division point, and the high-frequency may indicate a frequency range that is greater than the frequency division point. The frequency division point may be any value within an audible range that can be heard by the ear of the user, for example, 500 Hz, 600 Hz, 700 Hz, 800 Hz, 1000 Hz, etc. In some embodiments, if divided according to a principle of the acoustic driver, the acoustic driver may include, but is not limited to, a moving coil acoustic driver, a moving iron acoustic driver, a piezoelectric acoustic driver, an electrostatic acoustic driver, a magnetostrictive acoustic driver, etc. The acoustic driver may include a diaphragm. When the diaphragm vibrates, the sound may be transmitted from a front side and a rear side of the diaphragm respectively. The sound transmitted from the front side of the diaphragm of the acoustic driver and the sound transmitted from the rear side of the diaphragm of the acoustic driver may have the same amplitude and opposite phases. In this case, when the sounds transmitted from the front and rear sides of the diaphragm of the acoustic driver are radiated outward through the corresponding sound guide holes, the two parts of the sound may interfere during the propagation process, thereby reducing the far-field sound leakage of the acoustic output apparatus. In some embodiments, the acoustic driver may include a diaphragm and a magnetic circuit structure. The diaphragm and the magnetic circuit structure may be sequentially arranged along a vibration direction of the diaphragm. In some embodiments, the diaphragm may be mounted on a basin frame, and the basin frame may be fixed on the magnetic circuit structure. Alternatively, the diaphragm may be directly and fixedly connected to a side wall of the magnetic circuit structure. A side of the diaphragm facing away from the magnetic circuit structure may form a front side of the acoustic driver. A side of the magnetic circuit structure facing away from the diaphragm may form a rear side of the acoustic driver. The diaphragm may vibrate to make the acoustic driver radiate sound outward from the front side and the rear side of the acoustic driver, respectively. The acoustic driver may also include a voice coil. The voice coil may be fixed on the side of the diaphragm facing the magnetic circuit structure and disposed in a magnetic field formed by the magnetic circuit structure. When energized, the voice coil may vibrate under the action of the magnetic field and drive the diaphragm to vibrate, thereby generating the sound. The diaphragm vibration may cause the acoustic driver to radiate sound from the front side and the rear side of the acoustic driver, respectively.

The housing structure may be an enclosed or semi-enclosed housing structure with an internal hollow. The acoustic driver may be disposed in the housing structure. The housing structure may be a housing structure with a suitable shape for the ear of the user. The shape of the housing structure may include a circular ring, an oval, a (regular or irregular) polygonal, a U-shaped, a V-shaped, a semi-circle, etc., so that the housing structure may be directly anchored at the ear of the user. In some embodiments, the housing structure may also include one or more fixing structures. The fixing structure may include an ear hook, a head beam, or an elastic band, which may be used to fix the acoustic output apparatus on the user and prevent the acoustic output apparatus from falling. Merely by way of example, the fixing structure may be an ear hook configured to be worn around the ear of the user. As another example, the fixing structure may be a neck band configured to be worn around the neck/shoulder of the user. In some embodiments, the ear hook may be a continuous hook-shape component and may be elastically stretched to be worn on the ear of the user. In this case, the ear hook may also add pressure to the auricle of the user, thereby causing the acoustic output apparatus to be fixed to a certain position on the ear or head of the user. In some embodiments, the ear hook may be a discontinuous band. For example, an ear hook may include a rigid portion and a flexible portion. The rigid portion may be made of rigid material (e.g., plastic or metal). The rigid portion may be fixed to the housing structure of the acoustic output apparatus via a physical connection (e.g., a snap connection, a screw connection, etc.). The flexible portion may be made of elastic material (e.g., cloth, composite material, or/and neoprene).

The housing structure may include at least one first sound guide hole and at least one second sound guide hole. The first sound guide hole and the second sound guide hole may be respectively coupled with the front and rear sides of the diaphragm in a same acoustic driver. When the user wears the acoustic output apparatus, the housing structure may make the first sound guide hole and the second sound guide hole located on a same side of the face of the user. In some embodiments, the front side of the acoustic driver (diaphragm) in the housing structure may include a front chamber for sound transmission. The front chamber may be acoustically coupled with the first sound guide hole. The sound transmitted from the front side of the acoustic driver may be transmitted from the first sound guide hole through the front chamber. The rear side of the acoustic driver (diaphragm) in the housing structure may include a rear chamber for sound transmission. The rear chamber may be acoustically coupled with the second sound guide hole. The sound transmitted from the rear side of the acoustic driver may be transmitted from the second sound guide hole through the rear chamber. In some embodiments, structures of the front chamber and the rear chamber may be adjusted so that the sounds output from the sound guide hole on the front side of the acoustic driver and the sound guide hole on the rear side of the acoustic driver may meet a certain condition. For example, lengths of the front chamber and the rear chamber may be designed so that sounds with a specific phase relationship (e.g., opposite phases) may be output from the sound guide hole on the front side of the acoustic driver and the sound guide hole on the rear side of the acoustic driver. As a result, the problem of the far-field sound leakage of the acoustic output apparatus may be effectively resolved. In some embodiments, a shape of the sound guide hole may include, but is not limited to, a square, a circle, or a prism.

In some scenarios, the housing structure may include a user contact surface. When the user wears the acoustic output apparatus, the user contact surface may fit with or be close to the body part of the user (e.g., the face, the head). For the convenience of description, the user contact surface may also be called a user projection surface. The user projection surface may be understood as a surface of the housing structure with a largest projection area on the body part of the user, which may be closer to the body of the user than the acoustic driver. When the user wears the acoustic output apparatus, the user contact surface may be considered as being substantially parallel to the body part of the user (e.g., the face area) that is in direct contact with or facing the user contact surface. When the user wears the acoustic output apparatus, no matter whether the user contact surface is close to but not in contact with the body part of the user, or contact with the body part of the user, the acoustic output apparatus may output the sound outside of the housing structure through the sound guide holes on the housing structure, thereby transmitting the sound to the ear of the user. In some embodiments, a shape of the user contact surface may include a regular shape such as a circle, an ellipse, a rectangle, a triangle, a diamond, etc., or an irregular shape. In some embodiments, a surface of the user contact surface may be a smooth plane, or may be a surface containing one or more raised or concave areas. In some embodiments, the user contact surface may include a layer of a silicone material or a layer of hard plastic material (e.g., rubber, plastic, etc.). The layer of the silicone material or the layer of hard plastic material may be covered and bonded to an outer surface of the housing structure, or may be integrally formed with the housing structure. It should be noted that the shape and structure of the user contact surface of the housing structure are not limited to the above description and can be adjusted according to a specific condition, which is not further limited herein.

FIG. 1 is a schematic diagram illustrating two sound guide holes and a user contact surface of a housing structure according to some embodiments of the present disclosure. As shown in FIG. 1, in some embodiments, the at least two sound guide holes may include a first sound guide hole $B_1$ and a second sound guide hole $B_2$. The first sound guide hole $B_1$ and the second sound guide hole $B_2$ may radiate sound outward in a dipole manner or a dipole-like manner. A distance from the first sound guide hole $B_1$ to the user contact surface (the parallelogram in FIG. 1 may represent the user contact surface) may be smaller than a distance from the second sound guide hole $B_2$ to the user contact surface. A line connecting the first sound guide hole $B_1$ and the second sound guide hole $B_2$ may have an intersection A with the user contact surface. A normal vector of the user contact surface at point A may be $\vec{F}$. A direction vector of the line connecting the first sound guide hole $B_1$ and the second sound guide hole $B_2$ may be $\vec{x}$. A direction of the direction vector $\vec{x}$ may be a direction from the first sound guide hole $B_1$ to the second sound guide hole $B_2$. The direction vector $\vec{x}$ of the line connecting the first sound guide hole $B_1$ and the second sound guide hole $B_2$ may have an angle $\gamma$ with the normal vector $\vec{F}$ of the user contact surface at point A.

In some embodiments, when the user wears the acoustic output apparatus, the user contact surface may be substantially parallel to the body part of the user (e.g., the face area) that is in direct contact with or facing to the user contact surface. For convenience of description, the following description takes the face area of the user as an example of the body part of the user. That is to say, the user contact surface of the acoustic output apparatus may be substantially parallel to the face area. In this case, an angle relationship between the face area and the connection line between the at least two sound guide holes may be basically equivalent to an angle relationship between the user contact surface and the connection line between the at least two sound guide holes.

In some embodiments, the connection line between the at least two sound guide holes may be approximately perpendicular to the face area, i.e., the connection line between the at least two sound guide holes may be approximately perpendicular to the user contact surface. The approximately perpendicular to mentioned herein may mean that an included angle between the user contact surface and the line connecting the first sound guide hole $B_1$ and the second sound guide hole $B_2$ is in a range of 75° to 90°. In the embodiments of the present disclosure, the included angle between the user contact surface and the connection line between the at least two sound guide holes may refer to a complementary angle of an included angle ($\gamma$) formed between the direction vector $\vec{x}$ and the normal vector $\vec{F}$ of the user contact surface at point A. For example, when the included angle between the line connecting the first sound guide hole $B_1$ and the second sound guide hole $B_2$ and the user contact surface is in a range of 75° to 90°, the included angle γ between the direction vector $\vec{x}$ (which represents the line connecting the first sound guide hole $B_1$ and the second sound guide hole $B_2$) and the normal vector $\vec{F}$ of the user contact surface at point A may be in a range of 0° to 15°. Merely by way of example, in a case where the user contact surface is in contact with the body part of the user, in order to make the line connecting the first sound guide hole $B_1$ and the second sound guide hole $B_2$ approximately perpendicular to the body contact part of the user, the first sound guide hole $B_1$ and the second sound guide hole $B_2$ may be located on a side of the housing structure that is perpendicular or approximately perpendicular to the user contact surface at the same time. As another example, when the user contact surface is close to but not in contact with the body part of the user, in order to make the line connecting the first sound guide hole $B_1$ and the second sound guide hole $B_2$ approximately perpendicular to the body contact part of the user, the first sound guide hole $B_1$ and the second sound guide hole $B_2$ may be located on the side of the housing structure that is perpendicular or approximately perpendicular to the user contact surface at the same time, or alternatively, the first sound guide hole $B_1$ may be located on the user contact surface, and the second sound guide hole $B_2$ may be located on a side of the housing structure opposite to the user contact surface. Preferably, the included angle between the connection line between the at least two sound guide holes and the user contact surface may be 90°. At this time, the included angle γ between the direction vector $\vec{x}$ (which represents the line connecting the first sound guide hole and the second sound guide hole) and the normal vector $\vec{F}$ of the user contact surface at point A may be 0°. When the connection line between the at least two sound guide holes is approximately perpendicular to the face area, the sounds output by the acoustic output apparatus from the at least two sound guide holes may be reflected by the face area of the user. In far-field space, the reflected sound may interfere with the sound directly radiated by the acoustic output apparatus, thereby reducing the far-field sound and improving far-field sound leakage.

In some embodiments, the front side or the diaphragm of the acoustic driver and the housing structure may form a first chamber. The rear side of the acoustic driver and the housing structure may form a second chamber. The front side of the acoustic driver may radiate sound toward the first chamber, and the rear side of the acoustic driver may radiate sound toward the second chamber. In some embodiments, the housing structure may further include the first sound guide hole and the second sound guide hole. The first sound guide hole may communicate with the first chamber. The second sound guide hole may communicate with the second chamber. The sound generated at the front side of the acoustic driver may be propagated outward through the first sound guide hole. The sound generated at the rear side of the acoustic driver may be propagated outward through the second sound guide hole. In some embodiments, the magnetic circuit structure may include a magnetic conductive plate disposed opposite to the diaphragm. The magnetic conductive plate may include at least one sound guide hole (also known as a pressure relief hole) configured to guide the sound generated by the vibration of the diaphragm from the rear side of the acoustic driver and propagate the sound outside through the second chamber. The acoustic output apparatus may form a dual-point sound source (or a multiple-point sound source) similar to a dipole structure through sound radiation of the first sound guide hole and the second sound guide hole, and generate a specific sound field with a certain directivity.

In some embodiments, the front side of the acoustic driver and the housing structure may form a chamber. The front side of the acoustic driver may radiate sound toward the chamber, and the rear side of the acoustic driver may radiate sound directly to the outside of the acoustic output apparatus. In some embodiments, the housing structure may include one or more sound guide holes. The sound guide hole(s) may be acoustically coupled with the chamber and guide the sound radiated by the acoustic driver from the front side to the chamber to the outside of the acoustic output apparatus. In some embodiments, the magnetic circuit structure may include a magnetic conductive plate disposed opposite to the diaphragm. The magnetic conductive plate may include one or more sound guide holes (also known as pressure relief holes). The sound guide hole(s) may guide the sound generated by the vibration of the diaphragm from the rear side of the acoustic driver to the outside of the acoustic output apparatus. Since the sound guide hole(s) on the front sides of the acoustic driver and the sound guide hole(s) on the rear side of the acoustic driver are located on both sides of the diaphragm, it may be considered that the sound guided by the sound guide hole(s) on the front side of the acoustic driver and the sound guided by the sound guide hole(s) on the rear side of the acoustic driver have opposite or approximately opposite phases. Therefore, the sound guide hole(s) on the front side of the acoustic driver and the sound guide hole(s) on the rear side may form a dual-point sound source.

In some embodiments, the rear side of the acoustic driver and the housing structure may form a chamber. The rear side of the acoustic driver may radiate sound toward the chamber, and the front side of the acoustic driver may radiate sound directly to the outside of the acoustic output apparatus. In some embodiments, the magnetic circuit structure may include a magnetic conductive plate disposed opposite to the diaphragm. The magnetic conductive plate may include one or more sound guide holes (also known as pressure relief holes). The sound guide hole(s) may guide the sound generated by the vibration of the diaphragm from the rear side of the acoustic driver to the chamber. In some embodiments, the housing structure may include one or more sound guide holes. The sound guide hole(s) may be acoustically coupled with the chamber and guide the sound radiated by the acoustic driver to the chamber to the outside of the acoustic output apparatus. In some embodiments, the one or more sound guide holes may be disposed on a side wall of the housing structure close to the magnetic circuit structure. For example, when the user wears the acoustic output apparatus, the diaphragm may face the human ear, and a connection line between the one or more sound guide holes and a central position of the front side of the diaphragm may be approximately perpendicular to the face of the user. As another example, when the user wears the acoustic output apparatus, the diaphragm may not face the human ear, the diaphragm may be located at an upper or lower part of the housing structure, and the one or more sound guide holes may be located at positions opposite to the diaphragm in the housing structure, so that a connection line between the one or more sound guide holes and a central position of the front side of the diaphragm may be approximately parallel to the face of the user. In some cases, it may be considered that the sound transmitted directly from the front side of the diaphragm toward the external and the sound guided from the sound guide hole(s) have opposite or approximately opposite phases, so the front side of the diaphragm and the sound guide hole(s) may form a dual-point sound source.

In some embodiments, the acoustic output apparatus may include a first acoustic driver and a second acoustic driver. The first acoustic driver may include a first diaphragm. The second acoustic driver may include a second diaphragm. The first acoustic driver and the second acoustic driver may receive a first electrical signal and a second electrical signal, respectively. In some embodiments, when the first electrical signal and the second electrical signal have a same magnitude and opposite phases (e.g., the first acoustic driver and the second acoustic driver are electrically connected to a signal source in an opposite polarity manner, respectively, and receive a same original sound electrical signal emitted by the signal source), the first diaphragm and the second diaphragm may generate sounds with opposite phases. Further, the housing structure may carry the first acoustic driver and the second acoustic driver. The sound generated by the vibration of the first diaphragm may be radiated outward through the first sound guide hole on the housing structure. The sound generated by the vibration of the second diaphragm may be radiated outward through the second sound guide hole on the housing structure. For the convenience of description, the sound generated by the vibration of the first diaphragm may refer to the sound generated by the front side of the first acoustic driver. The sound generated by the vibration of the second diaphragm may refer to the sound generated by the front side of the second acoustic driver. When the sound generated by the vibration of the first diaphragm and the sound generated by the vibration of the second diaphragm are directly radiated outward through the corresponding first sound guide hole and the second sound guide hole, the first sound guide hole and the second sound guide hole here may be approximated as a dual sound source (e.g., a dual-point sound source). In some embodiments, the first sound guide hole may be disposed opposite to the second sound guide hole. For example, when the user wears the acoustic output apparatus, the first sound guide hole may face the human ear, and the connection line between the first sound guide hole and the second sound guide hole may be approximately perpendicular to the face of the user. As another example, when the user wears the acoustic output apparatus, the side wall of the acoustic output apparatus adjacent to the side wall where the first sound guide hole or the second sound guide hole is located may face the human ear, and the connection line between the first sound guide hole and the second sound guide hole may be approximately parallel to the face of the user.

In some embodiments, the first acoustic driver and the second acoustic driver may be the same or similar acoustic drivers, so that the amplitude-frequency responses of the first acoustic driver and the second acoustic driver in the whole frequency band are the same or similar. In some embodiments, the first acoustic driver and the second acoustic driver may be different acoustic drivers. For example, the frequency responses of the first acoustic driver and the second acoustic driver may be the same or similar at a middle-high-frequency band. The frequency responses of the first acoustic driver and the second acoustic driver may be different at a low-frequency band.

In some embodiments, the first acoustic driver may be located in the first chamber. The first acoustic driver may include the first diaphragm. The front side of the first acoustic driver and the housing structure may form a first front chamber. The rear side of the first acoustic driver and the housing structure may form a first rear chamber. The front side of the first acoustic driver may radiate sound toward the first front chamber. The rear side of the first acoustic driver may radiate sound toward the first rear chamber. The second acoustic driver may be located in the second chamber. The front side of the second acoustic driver and the housing structure may form a second front chamber. The rear side of the second acoustic driver and the housing structure may form a second rear chamber. The front side of the second acoustic driver may radiate sound toward the second front chamber. The rear side of the second acoustic driver may radiate sound toward the second rear chamber. In some embodiments, the first chamber and the second chamber may be the same. The first acoustic driver and the second acoustic driver may be disposed in the first chamber and the second chamber, respectively, in the same way, so that the first front chamber and the second front chamber may be the same. The first rear chamber and the second rear chamber may be the same. Therefore, the acoustic impedances of the front sides or the rear sides of the first acoustic driver and the second acoustic driver may be the same. In other embodiments, the first chamber and the second chamber may be different. The impedances of the front sides or the rear sides of the first acoustic driver and the second acoustic driver may be made the same by changing a size and/or a length of the chambers or adding a sound guide tube. The first acoustic driver may include a first diaphragm. The second acoustic driver may include a second diaphragm. At this time, the acoustic impedance of the first diaphragm and one sound guide hole of the at least two sound guide holes may be the same as the acoustic impedance of the second diaphragm and the other sound guide hole of the at least two sound guide holes.

In some embodiments, an acoustic damping structure (e.g., a metal filter mesh, a gauze mesh, a tuning net, a tuning cotton, a sound guide tube, etc.) may be provided at the sound guide hole to reduce the amplitude of the frequency response corresponding to the front side or the rear side of the acoustic driver, so that the amplitude of the frequency response corresponding to the front side of the acoustic driver may be close to or equal to the amplitude of the frequency response corresponding to the rear side of the acoustic driver.

Figure 2:
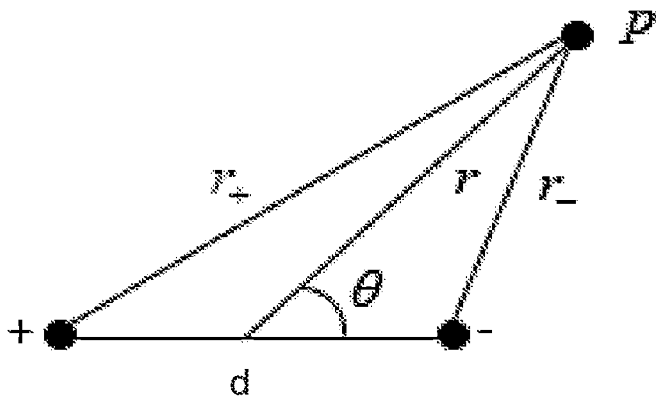
FIG. 2 is a schematic diagram illustrating a dipole according to some embodiments of the present disclosure.
Figure 3:
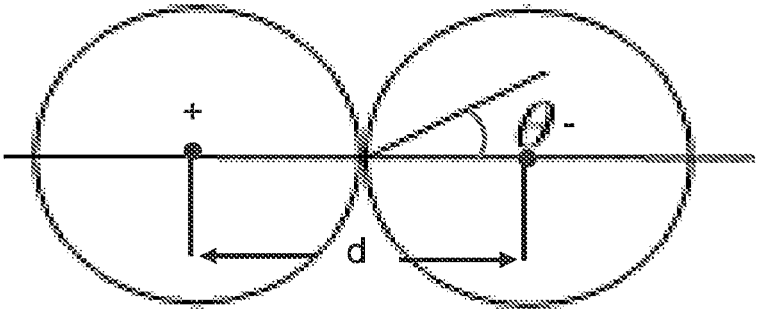
FIG. 3 is a basic principle diagram of a dipole and a user contact surface according to some embodiments of the present disclosure.

FIG. 2 is a schematic diagram illustrating a dipole according to some embodiments of the present disclosure. FIG. 3 is a basic principle diagram of a dipole and a user contact surface according to some embodiments of the present disclosure. In order to further illustrate an influence of the arrangement of the sound guide holes of the acoustic output apparatus on the sound output effect of the acoustic output apparatus, and considering that the sound can be regarded as propagating outward from the sound guide holes, each sound guide hole of the acoustic output apparatus may be regarded as a sound source that outputs sound outward. Merely for the convenience of description and illustration purposes, when a size of each of the sound guide holes of the acoustic output apparatus is relatively small, each sound guide hole may be approximately regarded as a point sound source. As shown in FIG. 2 and FIG. 3, the two sound guide holes of the acoustic output apparatus may be regarded as two point sound sources. The radiated sounds may have a same amplitude and opposite phases, which may be represented by "+" and "−" respectively. The two sound guide holes may form a dipole or may be similar to a dipole, and the sounds radiated outward may have obvious directivity, forming an "8"-shaped sound radiation region. In a direction of a straight line connecting the sound guide holes, the sounds radiated by the sound guide holes may be the loudest, and the sounds radiated in the other directions may be obviously reduced. The two sound guide holes may generate different sounds at different points in space, which may be calculated according to an angle θ between two lines one of which is a connection line between a midpoint of the connection line of the two sound guide holes and any point in space, the other line is the connection line of the two sound guide holes. In some embodiments, any sound guide hole disposed on the acoustic output apparatus for outputting sound may be approximated regarded as a single-point sound source of the acoustic output apparatus. A sound pressure p of a sound field generated by a single-point sound source may be represented by the equation:

$$p = \frac{|A|}{r} e^{j(\omega t - kr)}, \tag{1}$$

where $$\frac{|A|}{r}$$

denotes a sound pressure amplitude, co denotes an angular frequency, r denotes a distance between a point in space and the sound source, and K denotes a wave number. The magnitude of the sound pressure of the sound field of the point sound source may be inversely proportional to the distance between the point in space to the point sound source.

The sound radiated by the acoustic output apparatus to the surrounding environment (i.e., far-field leaked sound) may be reduced by disposing at least two sound guide holes in the acoustic output apparatus to construct a dual-point sound source. In some embodiments, the acoustic output apparatus may include the at least two sound guide holes, i.e., the dual-point sound source. The sound output by the two sound guide holes may have a certain phase difference. When positions and the phase difference of the dual-point sound source meet certain conditions, the acoustic output apparatus may show different sound effects in the near-field and the far-field. For example, when the phases of the point sound sources corresponding to the two sound guide holes are opposite, that is, when an absolute value of the phase difference between the two point sound sources is 180°, the far-field leaked sound may be reduced according to the principle of sound wave anti-phase cancellation. As shown in FIG. 2, a center distance between the sound guide holes of the acoustic output apparatus may be d, which may form a dipole (the dipole may be regarded as a combination of two pulsating spheres with opposite phases at a distance of d). At this time, a sound pressure of a target point p in space produced by the acoustic output apparatus may be represented by the equation:

$$p = \frac{|A|}{r_+} e^{j(\omega t - kr_+)} - \frac{|A|}{r_-} e^{j(\omega t - kr_-)}, \tag{2}$$

where A denotes a vibration intensity of the diaphragm, $$\frac{|A|}{r_+}$$

denotes an intensity of the point sound source "+", $$\frac{|A|}{r_-}$$

denotes an intensity of the point sound source "–", ω denotes the angular frequency, κ denotes the wave number, $r_+$ denotes a distance between the target point and the point sound source "+", and $r_-$ denotes a distance between the target point and the point sound source "–". When merely the sound field in the far-field is considered, and assuming r>>d, the amplitude difference between the sound waves radiated by the two point sound sources reaching the target point may be very small, and the amplitudes $r_+$ and $r_-$ in the above equation may be replaced by r, but the phase difference may not be ignored and have an approximate relationship as follows:

$$r_+ \approx r + \frac{d}{2}\cos\theta, \quad r_- \approx r - \frac{d}{2}\cos\theta, \tag{3}$$

where r denotes a distance between any target point p in space and a center position of the dual-point sound source, d denotes a distance between the two point sound sources, θ denotes an included angle between the straight line where the dual-point sound source is located and a connection line between the target point p and the center of the dual-point sound source. According to the above equations, when the frequency is not very high, kd<1, Equation (2) may be simplified as:

$$p \approx -j\frac{k|A|d}{r}\cos\theta e^{j(wt-kr)}. \tag{4}$$

According to equation (4), the sound pressure p of the target point in the sound field may be related to the included angle θ between the straight line where the dual-point sound source is located and the connection line between the target point and the center of the dual-point sound source, and the distance d between the two point sound sources.

Figure 4:
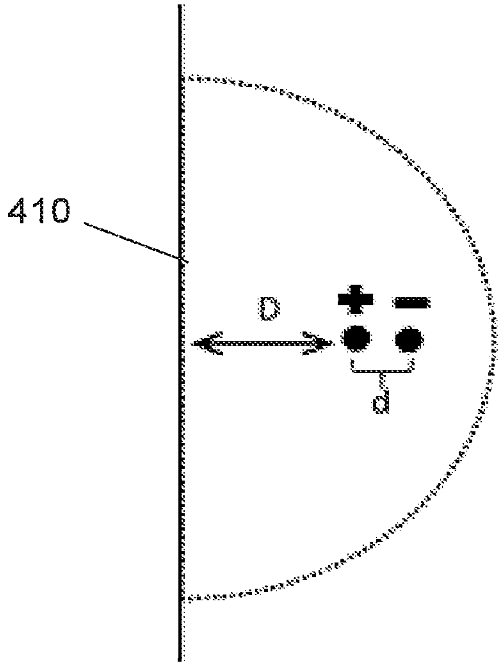
FIG. 4 is a schematic diagram illustrating a position of a dipole relative to a user face area according to some embodiments of the present disclosure.
Figure 5:
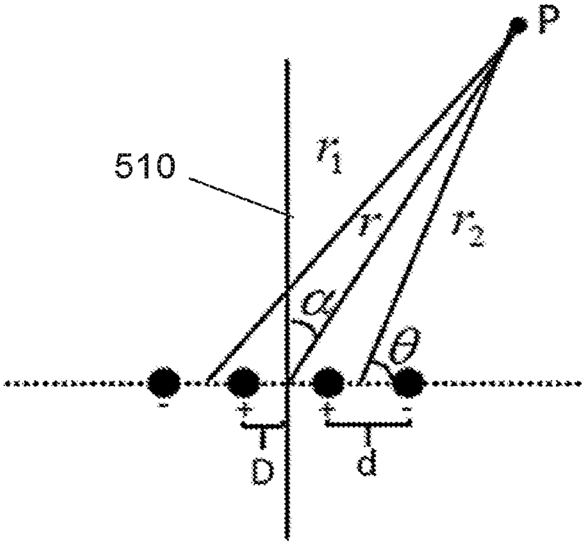
FIG. 5 is an equivalent basic principle diagram illustrating the reflection formed by a user face area to the sound of a dipole according to some embodiments of the present disclosure.

FIG. 4 is a schematic diagram illustrating a position of a dipole relative to a user face area according to some embodiments of the present disclosure. FIG. 5 is an equivalent basic principle diagram illustrating the reflection formed by a user face area to the sound of a dipole according to some embodiments of the present disclosure. As shown in FIG. 4 and FIG. 5, when the user wears the acoustic output apparatus, at least two sound guide holes of the acoustic output apparatus may be regarded as a dual-point sound source. Two sound sources may output sounds with a same amplitude and opposite phases respectively (represented by symbols "+" and "–" respectively), which may form a dipole. In this case, at any spatial point in the environment where the user is located, if the distances between the spatial point and the two single-point sound sources are equal, based on sound interference cancellation, a sound volume at this point may be very small. When the distances from the spatial point to the two single-point sound sources are not equal, the greater the distance difference, the greater the sound volume at the point. When an included angle between a connection line of the two single-point sound sources and a face area (for the sake of simplicity, a plane where an area of the user's face that fits directly or faces the acoustic output apparatus is located is equivalent to the face area) is in a range of 75° to 90°, it may be considered that the connection line between the two single-point sound sources is approximately perpendicular to the face area. In some embodiments, when the user wears the acoustic output apparatus, a user contact surface on the housing structure of the acoustic output apparatus may be substantially parallel to the face area, and at this time, it may be considered that the two single-point sound sources are also approximately perpendicular to the user contact surface. For ease of understanding, as shown in FIG. 4, the face area may be abstracted as a baffle 410. A distance between the two single-point sound sources formed by the at least two sound guide holes in the acoustic output apparatus may be denoted as d. A smallest distance between the two single-point sound sources and the baffle 410 may be denoted as D. When the two single-point sound sources generate sounds, a part of the sounds may be directly radiated into the environment, and the other part of the sounds may be radiated to the baffle 410 first, reflected by the baffle 410, and then radiated into the environment. In an ideal situation, in the presence of the baffle, a sound radiation effect of the two single-point sound sources on the environment may be equivalent to be as the basic principle diagram in FIG. 5. As shown in FIG. 5, the dual-point sound source formed by the two sound guide holes of the acoustic output apparatus may form a dipole, which may be located on a right side of a baffle 510. A distance between the dual-point sound source may be d. Distances from the dual-point sound source to the baffle 510 may be not equal. A smallest distance between the dual-point sound source and the baffle 510 may be D. An angle between a straight line where the dual-point sound source is located and a connection line between a center of the dual-point sound source and any observation point P in space may be θ. A distance from the center of the dual-point sound source to the observation point P may be $r_2$. Considering that the sound output by the dual-point sound source can be reflected by the baffle 510, it is equivalent to forming a virtual dual-point sound source on a left side of the baffle with the same amplitude as the dual-point sound source and opposite phases to the dual-point sound source. The virtual dual-point sound source may form a dipole. A distance between the virtual dual-point sound source may be d. A smallest distance between the virtual dual-point sound source and the baffle 510 may be D. A distance between a center of a connection line of the virtual dual-point sound source and the observation point P may be $r_{h1}$. The virtual dual-point sound source and the dual-point sound source may form a dual-dipole. An included angle between the baffle and a connection line between the observation point and a center of the dual-dipole may be α. A distance between the center of the dual-dipole and the observation point may be r. The sound pressure at the observation point may be represented by the equation:

$$p = -j\frac{k|A|d}{r_1}\cos\theta e^{j(wt-kr_1)} + j\frac{k|A|d}{r_2}\cos\theta e^{j(wt-kr_2)}. \tag{5}$$

In the far-field, the amplitude difference of the acoustic waves at the observation point P may be ignored, and the phase difference may be retained. If the angle between a normal line at the center of the dual-dipole and the connection line between the observation point and the center of the dual-dipole is α, then according to the figure, $$\theta \approx \frac{\pi}{2} - \alpha,$$

and an approximate relationship may be represented as follows:

$$r_1 \approx r + \left(D + \frac{d}{2}\right)\sin\alpha, \tag{6}$$

$$r_2 \approx r - \left(D + \frac{d}{2}\right)\sin\alpha. \tag{7}$$

The sound pressure may be obtained according to equations (5), (6), and (7) above and equation (8) below, and the synthesized sound pressure is the sound pressure produced by the two single-point sound sources to the environment when there is a baffle:

$$p = -\frac{2k|A|d}{r}e^{j(wt-kr)}\sin\alpha\sin\left[k\left(D + \frac{d}{2}\right)\sin\alpha\right]. \tag{8}$$

Figure 6:
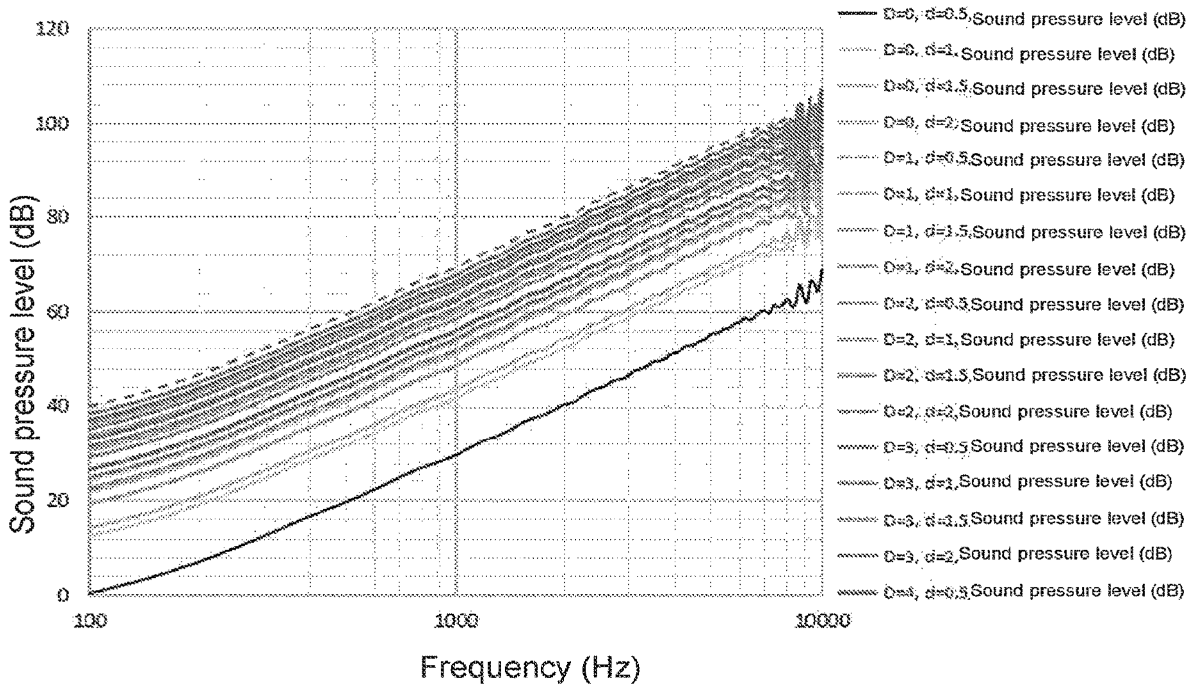
FIG. 6 is a graph of frequency response curves of acoustic output apparatuses with two point sound sources at different distances d and different distances D from one point sound source to a user face area according to some embodiments of the present disclosure
Figure 7:
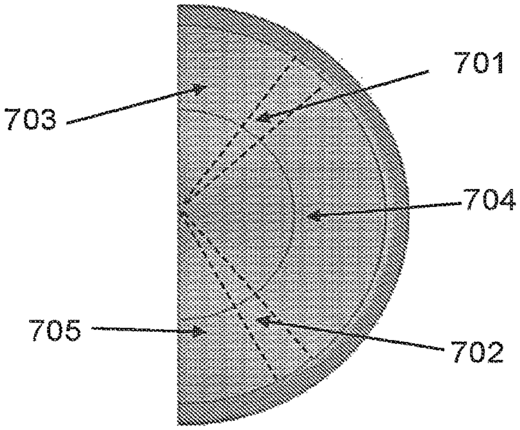
FIG. 7 is a sound field energy distribution diagram of two point sound sources at 1000 Hz according to some embodiments of the present disclosure.

FIG. 6 is a graph of frequency response curves of acoustic output apparatuses with two point sound sources at different distances d and different distances D when the two point sound sources are disposed in a manner shown in FIG. 4 according to some embodiments of the present disclosure. Distance D represents the smallest distance from a dual-point sound source to the user face area. FIG. 7 is a sound field energy distribution diagram of two point sound sources at 1000 Hz when the two point sound sources are disposed in a manner shown in FIG. 4 according to some embodiments of the present disclosure. As shown in FIG. 6 and FIG. 7, a connection line between at least two sound guide holes of the acoustic output apparatus may be perpendicular to the face area of the user (i.e., perpendicular to the user contact surface that is parallel or substantially parallel to the face area of the user). When the far-field observation point is 250 mm remote, sound pressure values may be tested respectively when D is 0 mm, 1 mm, 2 mm, or 3 mm, and the corresponding d is 0.5 mm, 1 mm, 1.5 mm, or 2 mm. The sound pressure value may be expressed by a sound pressure level (dB). It may be seen from FIG. 6 that a smallest distance between the dipole and the baffle is in a range of 0 mm to 5 mm. The distance between the dipole and the baffle, and the distance between the dipole may have an impact on the sound pressure at the far-field observation point. Further, the sound pressure level at the far-field observation point may decrease as the distance between the dipole and the baffle decreases. The sound pressure level at the far-field observation point may decrease as the distance between the dipole decreases. When the distance between the dipole and the baffle is 0, and the distance between the dipole is 0.5, the sound pressure level at the far-field observation point may be the smallest, and the sound leakage reduction effect may be relatively good at this time. As shown in FIG. 7, when the connection line between the at least two sound guide holes of the acoustic output apparatus is approximately perpendicular to the contact surface of the user's body, the smallest distance between the dipole and the baffle is 3 mm, the distance between the dipole is 0.5 mm, and the frequency is 1 kHz, a region outside a semicircle with a radius of 250 mm may be a far sound field, and it may be seen that the color of the sound pressure level in the far sound field is relatively light, that is, the sound pressure level of the far sound field may be relatively small, and the far-field leaked sound may be relatively small. In some embodiments, the volume of the far-field leaked sound of the acoustic output apparatus may be reduced by adjusting the distance between a sound guide hole and the user contact surface or the face area of the user. The at least two sound guide holes may include a first sound guide hole and a second sound guide hole. A distance from the first sound guide hole to the face area or the user contact surface may be smaller than a distance from the second sound guide hole to the face area or the user contact surface. Preferably, the distance from the first sound guide hole to the user contact surface may be smaller than or equal to 5 mm. More preferably, the distance from the first sound guide hole to the user contact surface may be smaller than or equal to 2 mm. Further preferably, the first sound guide hole may be disposed on the user contact surface. In other embodiments, the body part of the user may function as a baffle. A position relationship between the first sound guide hole, the second sound guide hole, and the user contact surface may be also applicable to a position relationship between the first sound guide hole, the second sound guide hole, and the user's body part (e.g., face area). For example, in some embodiments, when the user wears the acoustic output apparatus (i.e., when the user contact surface on the housing structure is close to the face area or near the face area), a distance from the first sound guide hole to the user's body part may be smaller than a distance from the second sound guide hole to the user body part. Preferably, the distance from the first sound guide hole to the user body part may be smaller than or equal to 5 mm. More preferably, the distance from the first sound guide hole to the user body part may be smaller than or equal to 2 mm. It should be noted that the user body part here refers to a part with a largest projection area of the user contact surface on the user body when the user wears the acoustic output apparatus. In some embodiments, the volume of the far-field leaked sound of the acoustic output apparatus may be reduced by adjusting the distance between the two sound guide holes. The distance between the first sound guide hole and the second sound guide hole may be smaller than or equal to 5 mm. Preferably, the distance between the first sound guide hole and the second sound guide hole may be smaller than or equal to 2 mm. More preferably, the distance between the first sound guide hole and the second sound guide hole may be smaller than or equal to 0.5 mm.

Figure 8:
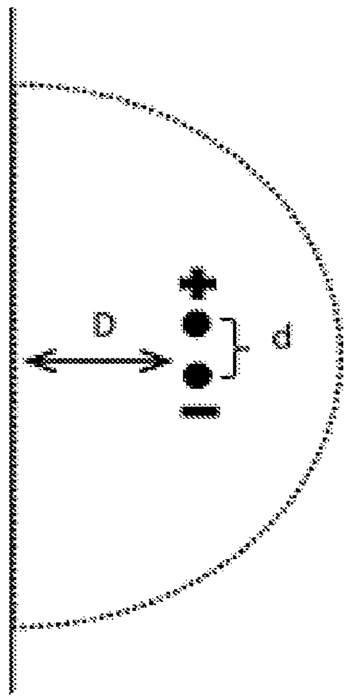
FIG. 8 is a schematic diagram illustrating a position of a dipole relative to a user face area according to some embodiments of the present disclosure.
Figure 9:
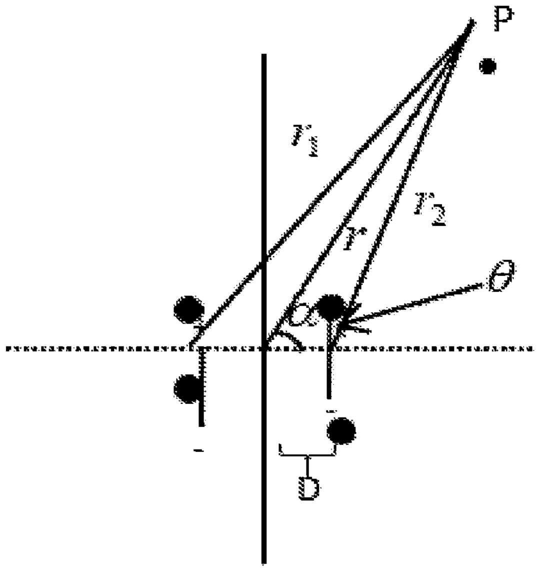
FIG. 9 is an equivalent basic diagram illustrating the reflection formed by a user face area to sound of a dipole according to some embodiments of the present disclosure.

FIG. 8 is a schematic diagram illustrating a position of a dipole relative to a user face area according to some embodiments of the present disclosure. FIG. 9 is an equivalent basic diagram illustrating the reflection formed by a user face area to the sound of a dipole according to some embodiments of the present disclosure. As shown in FIG. 8 and FIG. 9, when the user wears the acoustic output apparatus, at least two sound guide holes of the acoustic output apparatus may be regarded as two single-point sound sources and may form a dual-point sound source. The two single-point sound sources may output sounds with a same amplitude and opposite phases (represented by symbols "+" and "–", respectively) to form a dipole. In this case, for any spatial point in the environment where the user is located, when distances between the spatial point and the two single-point sound sources are equal, based on sound interference cancellation, a sound volume at this point may be very small. When the distances from the spatial point to the two single-point sound sources are not equal, the greater the distance difference, the greater the sound volume at the point. When an included angle between a connection line of the two single-point sound sources and a face area (for the sake of simplicity, a plane where an area of the user's face that fits directly or faces the acoustic output apparatus is located is equivalent to the face area) is in a range of 0° to 15°, the connection line between the two single-point sound sources may be considered as being approximately parallel to the face area. In some embodiments, when the user wears the acoustic output apparatus, a user contact surface on the housing structure of the acoustic output apparatus may be substantially parallel to the face area, and at this time, it may be considered that the two single-point sound sources are also approximately parallel to the user contact surface. For ease of understanding, as shown in FIG. 8, the face area may be abstracted as a baffle. A distance between the two single-point sound sources formed by the at least two sound guide holes in the acoustic output apparatus may be d. A smallest distance between one of the two single-point sound sources and the baffle may be D. When two single-point sound sources generate sounds, a part of the sounds may be directly radiated into the environment, and the other part of the sounds may be radiated to the baffle first, reflected by the baffle, and then radiated into the environment. In an ideal situation, in the presence of the baffle, a sound radiation effect of the two single-point sound sources on the environment may be equivalent to be as the basic principle diagram in FIG. 9. As shown in FIG. 9, the dual-point sound source formed by the two sound guide holes of the acoustic output apparatus may form a dipole, which may be located on a right side of a baffle. A distance between the dual-point sound source may be d. Distances from the dual-point sound source to the baffle may be equal. A smallest distance between the dual-point sound source and the baffle may be D. An angle between a straight line where the dual-point sound source is located and a connection line between a center of the dual-point sound source and any observation point P in space may be 0. A distance from the center of the dual-point sound source to the observation point P may be $r_2$. Considering that the sound output by the dual-point sound source can be reflected by the baffle, it is equivalent to forming a virtual dual-point sound source on the left side of the baffle with the same amplitude and the same phase as the dual-point sound source. The virtual dual-point sound source may form a dipole. A distance between the virtual dual-point sound source may be d. A smallest distance between the virtual dual-point sound source and the baffle may be D. A distance between a center of a connection line of the virtual dual-point sound source and the observation point P may be $r_1$. The virtual dual-point sound source and the dual-point sound source may form a dual-dipole. An included angle between the baffle and a connection line between the observation point and a center of the dual-dipole may be a. A distance between the center of the dual-dipole and the observation point may be r. The sound pressure at the observation point may be represented by the equation (9) below:

$$p = -j\frac{k|A|d}{r_1}\cos\theta e^{j(wt-kr_1)} - j\frac{k|A|d}{r_2}\cos\theta e^{j(wt-kr_2)}, \tag{9}$$

In the far-field, the amplitude difference of the acoustic waves at the observation point P may be ignored, and the phase difference may be retained. If the angle between a normal at the center of the dual-dipole and the connection line between the observation point and the center of the dual-dipole is α, then according to the figure, θ≈α, and the approximate relationship is represented as follows:

$$r_1 \approx r + D \sin \alpha, \tag{10}$$

$$r_2 \approx r - D \sin \alpha. \tag{11}$$

The synthesized sound pressure may be obtained based on equations (9), (10) and (11) above and the following equation (12):

$$p = -j\frac{k|A|d}{r}e^{j(wt-kr)}\cos\alpha\frac{\sin(2kD\sin\alpha)}{\sin(kD\sin\alpha)}. \tag{12}$$

Figure 10:
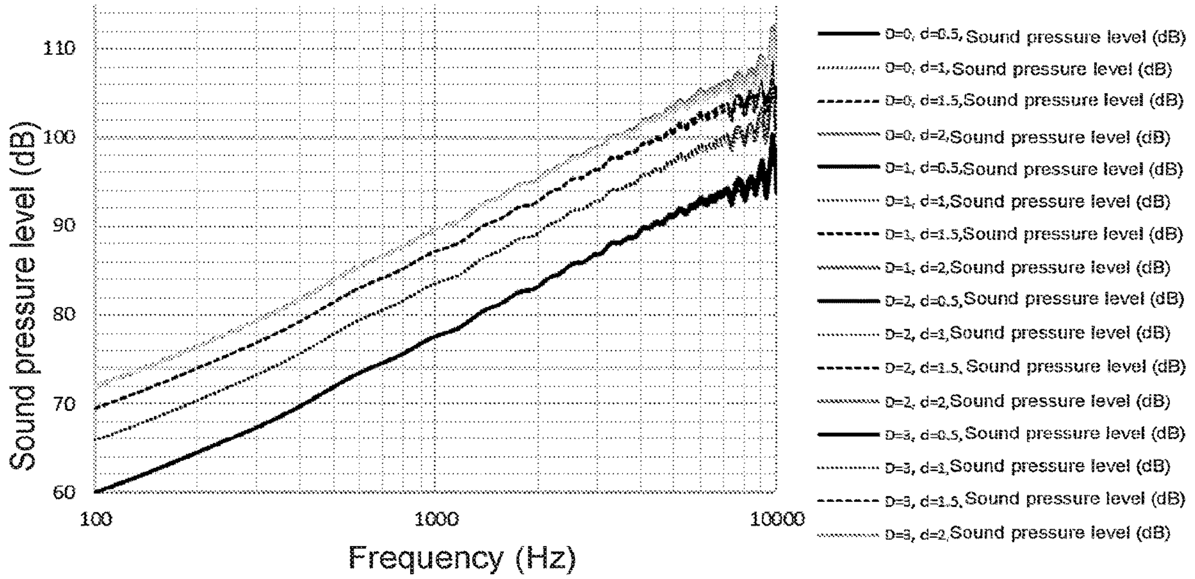
FIG. 10 is a graph of frequency response curves of acoustic output apparatuses with two point sound sources at different distances d and different distances D from one point sound source to a user face region according to some embodiments of the present disclosure.
Figure 11:
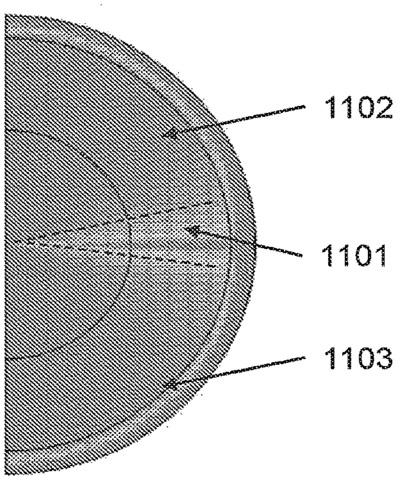
FIG. 11 is a sound field energy distribution diagram of two point sound sources at 1000 Hz according to some embodiments of the present disclosure.

FIG. 10 is a graph of frequency response curves of acoustic output apparatuses with two point sound sources at different distances d and different distances D when two point sound sources are disposed in a manner shown in FIG. 8 according to some embodiments of the present disclosure. FIG. 11 is a sound field energy distribution diagram of two point sound sources at 1000 Hz when the two point sound sources are disposed in a manner shown in FIG. 8 according to some embodiments of the present disclosure. As shown in FIG. 10 and FIG. 11, a connection line between at least two sound guide holes of the acoustic output apparatus may be approximately parallel to the face area of the user (i.e., perpendicular to the user contact surface that is parallel or substantially parallel to the face area of the user). When the far-field observation point is 250 mm remote, sound pressure values may be tested respectively when D is 0 mm, 1 mm, 2 mm, or 3 mm, and the corresponding d is 0.5 mm, 1 mm, 1.5 mm, or 2 mm. The sound pressure value may be expressed by a sound pressure level (dB). It should be noted that when the connection line between the first sound guide hole and the second sound guide hole is approximately parallel to the user face area or the user contact surface, the distance from the first sound guide hole to the user face area or the user contact surface and the distance from the second sound guide hole to the user face area or the user contact surface may be equal or substantially equal. Being substantially equal herein may mean that a difference between the distance from the first sound guide hole to the user face area (or the user contact surface) and the distance from the second sound guide hole to the user face area (or the user contact surface) is within a specific range. The specific range herein may be smaller than or equal to 5 mm, smaller than or equal to 3 mm, or smaller than or equal to 1.5 mm. Merely by way of example, the at least two sound guide holes may include the first sound guide hole and the second sound guide hole. The distance from the first sound guide hole to the face area or the user contact surface may be close to the distance from the second sound guide hole to the face area or the user contact surface. Preferably, the distance from the first sound guide hole to the user contact surface may be smaller than or equal to 5 mm. More preferably, the distance from the first sound guide hole to the user contact surface may be smaller than or equal to 2 mm. It may be seen from FIG. 10 that a smallest distance between the dipole and the baffle is in a range of 0 mm to 5 mm. The distance between the dipole may have a great impact on the sound pressure of the far-field at the far-field observation point. Further, the sound pressure level of the far-field at the far-field observation point may decrease as the distance between the dipole decreases. When the distance between the dipole is 0.5 mm, the sound pressure level of the far-field at the far-field observation point may be the smallest, and the sound leakage reduction effect may be relatively good at this time. In some embodiments, the volume of far-field leaked sound of the acoustic output apparatus may be reduced by adjusting the distance between the sound guide hole and the user contact surface or the user face area. The at least two sound guide holes may include the first sound guide hole and the second sound guide hole. The distance from the first sound guide hole to the face area or the user contact surface may be smaller than the distance from the second sound guide hole to the face area or the user contact surface. Preferably, the distance from the first sound guide hole to the user contact surface may be smaller than or equal to 5 mm. More preferably, the distance from the first sound guide hole to the user contact surface may be smaller than or equal to 2 mm. Both the first sound guide hole and the second sound guide hole may be located on the user contact surface, or the first sound guide hole and the second sound guide hole may be respectively located on two side walls adjacent to the user contact surface on the housing structure. As shown in FIG. 10, when the connection line between the at least two sound guide holes of the acoustic output apparatus is approximately parallel to the face area of the user's body, the smallest distance between the dipole and the baffle is 3 mm, the distance between the dipole is 0.5 mm, and the frequency is 1 kHz, a region outside a semicircle with a radius of 250 mm may be the far sound field, and it may be seen that the color in the semi "8"-shaped area of the near sound field is relatively dark, that is, the sound pressure level in this area of the near sound field may be relatively large, and the volume of the near-field sound may be relatively large. In the direction perpendicular to the connection line of the dipole, the color of a part of the area is lighter, that is, the sound pressure level of the sound field in this area is smaller, and the sound leakage is smaller. In this case, the volume of far-field leaked sound of the acoustic output apparatus may be reduced by adjusting the distance between the two sound guide holes. The distance between the first sound guide hole and the second sound guide hole may be smaller than or equal to 2 mm. Preferably, the distance between the first sound guide hole and the second sound guide hole may be smaller than or equal to 0.5 mm.

Figure 12:
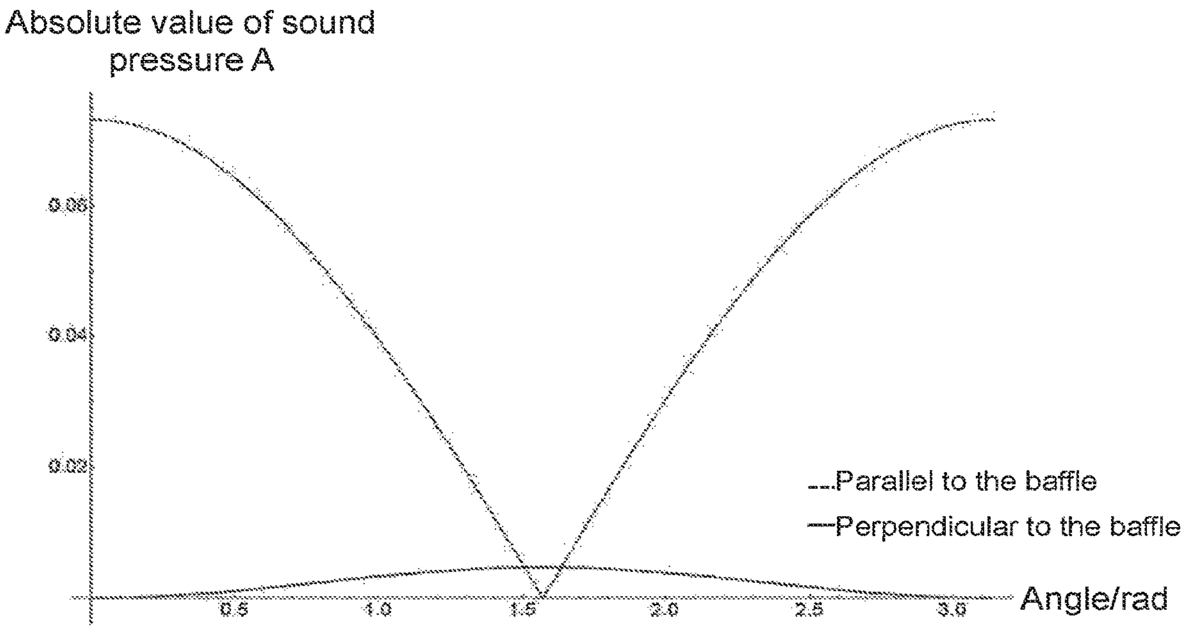
FIG. 12 is a sound pressure curve graph of an included angle between a connection line of two sound guide holes and a user contact surface or a user body part under different conditions according to some embodiments of the present disclosure.

FIG. 12 is a sound pressure curve graph of an included angle between a connection line of two sound guide holes and a user contact surface or a user body part under different conditions according to some embodiments of the present disclosure. A dipole formed by at least two sound guide holes of the acoustic output apparatus corresponding to FIG. 12 may have a smallest distance of 3 mm away from the user's body part (baffle). A distance between the dipole may be 0.5 mm. A far-field region may be a region other than a circle with a center of the dipole as an origin and a radius of 250 mm. In the figure, the horizontal axis may be an angle between an observation point in the far-field region and the center of the dipole, and the vertical axis may be a sound pressure at the observation point. The solid line in the figure may be a relationship curve between an absolute value of the sound pressure at the far-field observation point and the observation angle (an angle between a normal line at the center of the dual-dipole and a connection line between the observation point and a center of the dual-dipole) when the connection line between the at least two sound guide holes of the acoustic output apparatus is approximately perpendicular to the user face area. The sound pressure at the observation point in the far-field region may increase gradually as the observation angle increases in a range of 0 to $$\frac{\pi}{2}.$$

When the observation angle is $$\frac{\pi}{2},$$

that is, when the connection line between the far-field observation point and the center of the dipole is perpendicular to the baffle, the absolute value of the sound pressure may be the maximum. The sound pressure at the observation point in the far-field region may decrease gradually as the angle between the observation point and the center of the dipole increases in a range of $$\frac{\pi}{2}$$

to π. The dotted line in the figure may be a relationship curve between the absolute value of the sound pressure at the far-field observation point and the observation angle when the dipole formed by at least two sound guide holes of the acoustic output apparatus is approximately parallel to the user face area. The sound pressure at the observation point in the far-field region may decrease gradually as the angle between the observation point and the center of the dipole increases in a range of 0 to $$\frac{\pi}{2}.$$

When the observation angle is $$\frac{\pi}{2},$$

that is, when the connection line between the far-field observation point and the center of the dipole is perpendicular to the baffle, the absolute value of the sound pressure may be the minimum. The sound pressure at the observation point in the far-field region may increase gradually as the angle between the observation point and the center of the dipole increases in a range of $$\frac{\pi}{2}$$

to π. The absolute value of the maximum sound pressure when the dipole formed by the at least two sound guide holes of the acoustic output apparatus is approximately perpendicular to the user face area may be smaller than the absolute value of the maximum sound pressure when the dipole formed by the at least two sound guide holes of the acoustic output apparatus is approximately parallel to the user face area.

Figure 13:
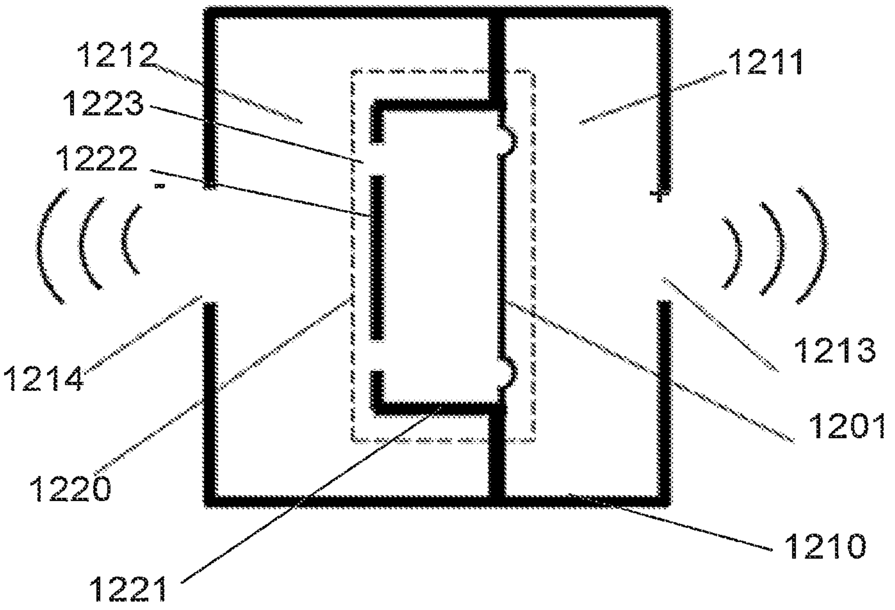
FIG. 13 is a schematic structural diagram illustrating an exemplary acoustic output apparatus according to some embodiments of the present disclosure.

FIG. 13 is a schematic structural diagram illustrating an exemplary acoustic output apparatus according to some embodiments of the present disclosure. In some embodiments, the sound guide holes in FIG. 13 may be suitable for forming a dual-point sound source or a dipole as described elsewhere in the present disclosure. As shown in FIG. 13, the acoustic driver 1200 may include a diaphragm 1201 and a magnetic circuit structure 1222. The acoustic driver 1200 may also include a voice coil (not shown). The voice coil may be fixed on a side of the diaphragm 1201 towards the magnetic circuit structure 1222 and located in a magnetic field formed by the magnetic circuit structure 1222. When energized, the voice coil may vibrate under the action of the magnetic field and drive the diaphragm 1201 to vibrate, thereby generating sound. For ease of description, a side of the diaphragm 1201 facing away from the magnetic circuit structure 1222 (i.e., the right side of the diaphragm 1201 in FIG. 13) may be regarded as a front side of the acoustic driver 1200. A side of the magnetic circuit structure 1222 facing away from the diaphragm 1201 (i.e., a left side of the magnetic circuit structure 1222 in FIG. 13) may be regarded as a rear side of the acoustic driver 1200. The vibration of the diaphragm 1201 may cause the acoustic driver 1200 to radiate sound outward from the front side and the rear side of the acoustic driver, respectively. As shown in FIG. 13, the front side or the diaphragm 1201 of the acoustic driver 1200 and the housing structure 1210 may form a first chamber 1211. The rear side of the acoustic driver 1200 and the housing structure 1210 may form a second chamber 1212. The front side of the acoustic driver 1200 may radiate sound toward the first chamber 1211, and the rear side of the acoustic driver 1200 may radiate sound toward the second chamber 1212. In some embodiments, the housing structure 1210 may further include a first sound guide hole 1213 and a second sound guide hole 1214. The first sound guide hole 1213 may communicate with the first chamber 1211. The second sound guide hole 1214 may communicate with the second chamber 1212. The sound generated at the front side of the acoustic driver 1200 may be propagated outward through the first sound guide hole 1213. The sound generated at the rear side of the acoustic driver 1200 may be propagated outward through the second sound guide hole 1214. In some embodiments, the magnetic circuit structure 1222 may include a magnetic conductive plate 1221 disposed opposite to the diaphragm. The magnetic conductive plate 1221 may include at least one sound guide hole 1223 (also known as a pressure relief hole) configured to guide the sound generated by the vibration of the diaphragm 1201 from the rear side of the acoustic driver 1200 and propagate the sound toward through the second chamber 1212. The acoustic output apparatus may form a dual-point sound source (or multiple sound sources) similar to a dipole structure through sound radiation of the first sound guide hole 1213 and the second sound guide hole 1214, and generate a specific sound field with a certain directivity. In some embodiments, the acoustic driver 1220 may directly output sound outside outward, that is, the acoustic output apparatus 1200 may not include the first chamber 1211 and/or the second chamber 1212. The sound emitted from the front side and the rear side of the acoustic driver 1220 may be used as a dual-sound source. It should be noted that the acoustic output apparatus in the embodiments of the present disclosure is not limited to the application of earphones, and may also be applied to other audio output devices (e.g., a hearing aid, a microphone, etc.).

Figure 14:
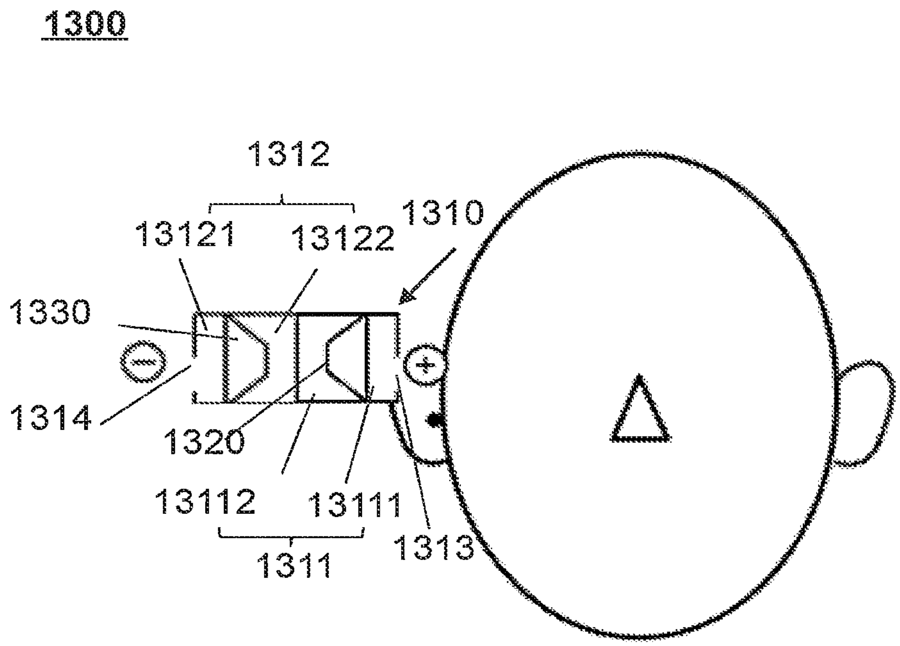
FIG. 14 is a schematic structural diagram illustrating another exemplary acoustic output apparatus according to some embodiments of the present disclosure.
Figure 15:
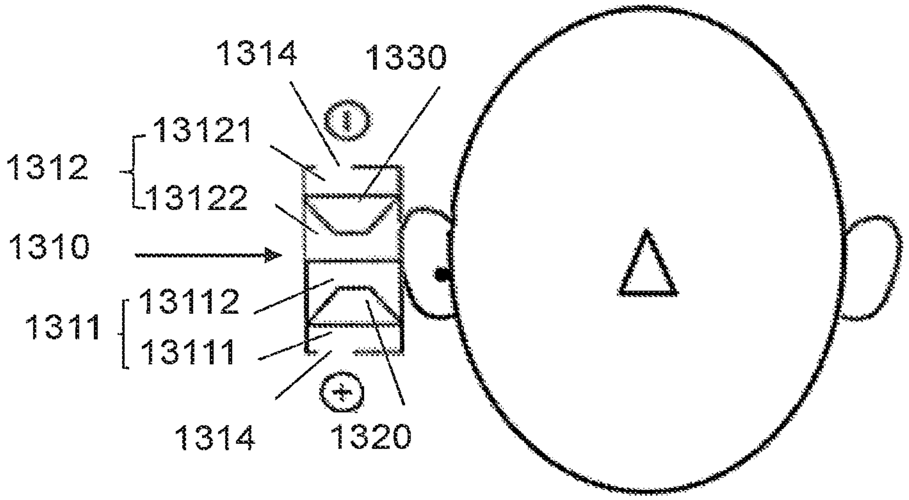
FIG. 15 is a schematic structural diagram illustrating another exemplary acoustic output apparatus according to some embodiments of the present disclosure.

FIG. 14 is a schematic structural diagram illustrating another exemplary acoustic output apparatus according to some embodiments of the present disclosure. FIG. 15 is a schematic structural diagram illustrating another exemplary acoustic output apparatus according to some embodiments of the present disclosure. As shown in FIG. 14, a connection line between a first sound guide hole 1313 of a first acoustic driver 1320 and a second sound guide hole 1314 of a second acoustic driver 1330 may be approximately perpendicular to a user body part or a user contact surface of the acoustic output apparatus. The first acoustic driver 1320 and the second acoustic driver 1330 may be the same acoustic driver. A signal processing module may control a front side of the first acoustic driver 1320 and the front side of the second acoustic driver 1330 through a control signal (e.g., a first electrical signal and a second electrical signal) to generate sounds whose phases and amplitudes satisfy a certain condition (e.g., sounds with the same amplitude and opposite phases, sounds with different amplitudes and opposite phases, etc.). The sound generated from the front side of the first acoustic driver 1320 may be radiated to the outside of the acoustic output apparatus 1310 through the first sound guide hole 1313. The sound generated from the front side of the second acoustic driver 1330 may be radiated to the outside of the acoustic output apparatus 1310 through the second sound guide hole 1314. The first sound guide hole 1313 and the second sound guide hole 1314 may be equivalent to a dual-sound source outputting sounds with opposite phases. Unlike the case where a dual-sound source is constructed by sounds emitted by the front side and rear side of the acoustic driver, through the front sides of the two acoustic drivers, namely the front side of the first acoustic driver 1320 and the front side of the second acoustic driver 1330, sounds with opposite phases may be generated and radiated outward through the first sound guide hole 1313 and the second sound guide hole 1314. When an acoustic impedance from the first acoustic driver 1320 to the first sound guide hole 1313 is the same as or similar to the acoustic impedance from the second acoustic driver 1330 to the second sound guide hole 1314, the sounds emitted by the first sound guide hole 1313 and the second sound guide hole 1314 in the acoustic output apparatus 1310 may be constructed as an effective dual-sound source, that is, the first sound guide hole 1313 and the second sound guide hole 1314 may emit sounds with opposite phases more accurately. In the far field, especially in a mid-high-frequency band (e.g., 200 Hz-20 kHz), the sound emitted at the first sound guide hole 1313 and the sound emitted at the second sound guide hole 1314 may be better canceled out, which can better suppress the sound leakage of the acoustic output apparatus in the mid-high-frequency band to a certain extent, and can prevent the sound generated by the acoustic output apparatus 1310 from being heard by others near the user, thereby improving the sound leakage reduction effect of the acoustic output apparatus 1310.

When the front side of the first acoustic driver 1320 and the front side of the second acoustic driver 1330 are located on different sides of the housing structure, and the first sound guide hole 1313 and the second sound guide hole 1314 are also located on different sides of the housing structure 1310, the housing structure 1310 may act as a baffle between the dual-sound source (e.g., the sound emitted by the first sound guide hole 1313 and the sound emitted by the second sound guide hole 1314). At this time, the housing structure 1310 may separate the first sound guide hole 1313 and the second sound guide hole 1314, so that the first sound guide hole 1313 and the second sound guide hole 1314 may have different acoustic routes to the ear canal of the user. On one hand, disposing the first sound guide hole 1313 and the second sound guide hole 1314 on both sides of the housing structure 1310 may increase a sound path difference between the first sound guide hole 1313 and the second sound guide hole 1314 (that is, a route difference between the sounds that are emitted by the first sound guide hole 1313 and the second sound guide hole 1314 and reach the user's ear canal), so that the effect of sound cancellation at the user's ear (that is, the near-field) is weakened, thereby increasing the volume of the sound heard by the user's ear (also known as near-field sound), and providing a better listening experience for the user. On the other hand, the housing structure 1310 may have little effect on the sounds transmitted by the sound guide holes to the environment (also known as far-field sound), and the far-field sounds generated by the first sound guide hole 1313 and the second sound guide hole 1314 may still be better canceled out, which can suppress the sound leakage of the acoustic output apparatus 1300 to a certain extent, and at the same time can prevent the sound generated by the acoustic output apparatus 1300 from being heard by others near the user. Therefore, through the above arrangement, the listening volume of the acoustic output apparatus 1300 in the near field can be improved and the sound leakage volume of the acoustic output apparatus 1300 in the far field can be reduced.

An overall structure of the acoustic output apparatus shown in FIG. 15 may be similar to that of the acoustic output apparatus shown in FIG. 14. The difference between the overall structures may be that the front side of the first acoustic driver 1320 faces down, the front side of the second acoustic driver 1330 faces up, the first sound guide hole 1313 on the housing structure 1310 is configured to output the sound emitted by the front side of the first acoustic driver 1320, the second sound guide hole 1314 on the housing structure 1310 is configured to output the sound emitted by the front side of the second acoustic driver 1330, and the connection line between the dipole formed by the sound emitted by the first sound guide hole 1313 and the sound emitted by the second sound guide hole 1314 may be approximately parallel to the user body part or the user contact surface of the acoustic output apparatus.

Figure 16:
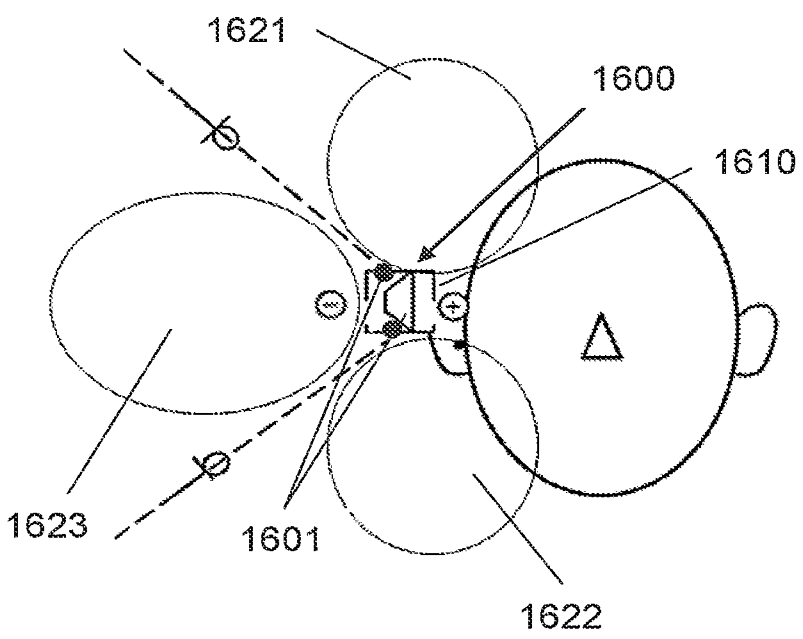
FIG. 16 is a schematic structural diagram illustrating an exemplary acoustic output apparatus according to some embodiments of the present disclosure.

In some embodiments, in order to improve the noise reduction effect of the acoustic output apparatus, the acoustic output apparatus may further include at least one microphone. The at least one microphone may be configured to acquire a noise signal from an external environment. The microphone may transmit the noise signal to a signal processing module of the acoustic output apparatus. The signal processing module may generate a sound signal with an opposite phase and the same amplitude as the noise signal based on the parameters (such as phase and amplitude) of the noise signal to achieve noise reduction. FIG. 16 is a schematic structural diagram illustrating an exemplary acoustic output apparatus according to some embodiments of the present disclosure. As shown in FIG. 16, when the connection line between the dipole formed by the sounds emitted by the two sound guide holes of the acoustic output apparatus 1600 (represented by "+" and "−" shown in FIG. 16) is approximately perpendicular to the face area of the user, the microphone 1601 may be located at the housing structure 1610 of the acoustic output apparatus 1600 or at the acoustic driver (e.g., a magnetic circuit structure). In some embodiments, the microphone 1601 may be disposed outside or inside a side wall of the housing structure 1610. In some embodiments, the microphone 1601 may also be located on the side wall of the housing structure 1610 on a peripheral side of the magnetic circuit structure. In some embodiments, when the microphone 1601 acquires noise of the external environment, in order to reduce the sound emitted by the acoustic output apparatus 1600 itself, the microphone 1610 may be located away from the sound guide hole, for example, the microphone 1601 may be located on a side wall different from a side wall where the sound guide hole is located on the housing structure 1610. Further, when the connection line between the dipole formed by the sounds at the two sound guide holes of the acoustic output apparatus 1600 is approximately perpendicular to the face area of the user, the acoustic output apparatus may have a minimum sound pressure area (i.e., the dotted line in FIG. 16 and the area near the dotted line). The minimum sound pressure area may refer to an area where a sound intensity output by the acoustic output apparatus is relatively small. For example, the lighter-colored areas 701 and 702 in FIG. 7. In some embodiments, the microphone 1601 may be located in the minimum sound pressure area of the acoustic output apparatus. Specifically, as shown in FIG. 16, when the connection line between the dual-point sound source formed by the at least two sound guide holes of the acoustic output apparatus 1600 is approximately perpendicular to the face area of the user, three relatively strong sound field areas (e.g., a sound field area 1621, a sound field area 1622, and a sound field area 1623 shown in FIG. 16) and two minimum sound pressure areas (i.e., the dotted line in FIG. 16 and the area near the dotted line) may simultaneously occur. Combined with FIG. 7 and FIG. 16, the relatively strong sound field areas may correspond to three dark-colored areas (e.g., an area 703, an area 704, and an area 705) shown in FIG. 7. The minimum sound pressure areas may correspond two relatively light-colored areas 701 and 702 shown in FIG. 7. One or more microphones 1601 may be disposed in the relatively light-colored areas 701 and 702 shown in FIG. 7. Preferably, the one or more microphones 1601 may be disposed in a center line of the relatively light-colored area 701 and/or area 702 in FIG. 7, that is, dotted lines shown in FIG. 16. By disposing the microphone 1601 at the minimum sound pressure area of the acoustic output apparatus, the microphone 1601 may receive as little sound as possible from the acoustic device 1600 itself while acquiring the noise of the external environment, so that the microphone 1601 can provide a more realistic ambient sound for subsequent sound signal processing to realize a function such as active noise reduction of the acoustic output apparatus 1600.

Figure 17:
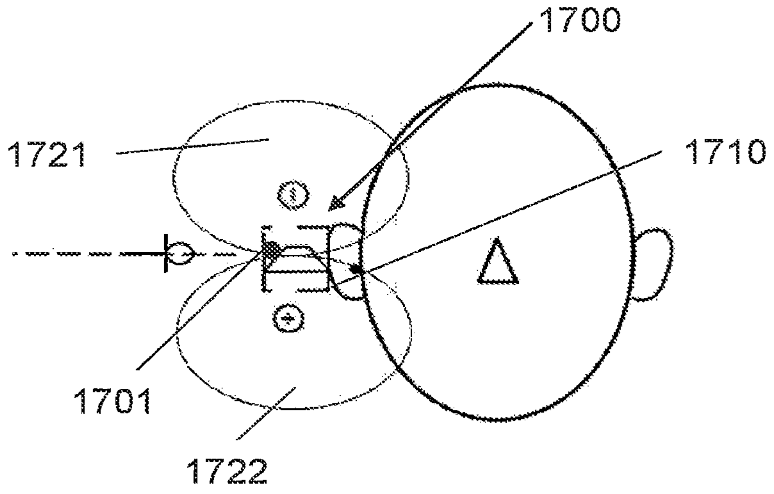
FIG. 17 is a schematic structural diagram illustrating an exemplary acoustic output apparatus according to some embodiments of the present disclosure.

FIG. 17 is a schematic structural diagram illustrating an exemplary acoustic output apparatus according to some embodiments of the present disclosure. As shown in FIG. 17, when the connection line between the dipole formed by the sounds emitted by the two sound guide holes of the acoustic output apparatus 1700 (represented by "+" and "−" shown in FIG. 17) is approximately parallel to the face area of the user, the microphone 1701 may be located at the housing structure 1710 of the acoustic output apparatus 1700 or at the acoustic driver (e.g., a magnetic circuit structure). In some embodiments, the microphone 1701 may be disposed outside or inside a side wall of the housing structure 1710. In some embodiments, the microphone 1701 may also be located on the side wall of the housing structure 1710 on a peripheral side of the magnetic circuit structure. In some embodiments, when the microphone 1701 acquires noise of the external environment, in order to reduce the sound emitted by the acoustic output apparatus 1700 itself, the microphone 1710 may be located away from the sound guide hole, for example, the microphone 1701 may be located on a side wall different from a side wall where the sound guide hole is located on the housing structure 1710. Further, when the connection line between the dipole formed by the sounds at the two sound guide holes of the acoustic output apparatus 1700 is approximately parallel to the face area of the user, the acoustic output apparatus may have a minimum sound pressure area (i.e., the dotted line in FIG. 17 and the area near the dotted line). In some embodiments, the microphone 1701 may be located in the minimum sound pressure area of the acoustic output apparatus. Specifically, as shown in FIG. 17, when the connection line between the dual-point sound source formed by at least two sound guide holes of the acoustic output apparatus 1700 is approximately parallel to the face area of the user, two relatively strong sound field areas (e.g., an area 1721 and an area 1722 shown in FIG. 17) and a minimum sound pressure area (i.e., the dotted line and the area near the dotted line in FIG. 16) may be simultaneously presented. Combined with FIG. 11 and FIG. 17, the relatively strong sound field areas 1721 and 1722 may correspond to two dark-colored areas 1102 and 1103 with relatively large sound pressure shown in FIG. 11. The minimum sound pressure area may correspond to a light-colored minimum sound pressure area 1101 shown in FIG. 11. One or more microphones 1701 may be disposed in the dotted line shown in FIG. 17 and the area near the dotted line. Preferably, the one or more microphones 1701 may be disposed in the dotted lines shown in FIG. 17. By disposing the microphone 1701 at the minimum sound pressure area of the acoustic output apparatus 1700, the microphone 1701 may receive as little sound as possible from the acoustic device 1700 itself while acquiring the noise of the external environment, so that the microphone 1701 can provide a more realistic ambient sound for subsequent sound signal processing to realize a function such as active noise reduction of the acoustic output apparatus 1700.

It should be noted that the acoustic output apparatus 1600 in FIG. 16 and the acoustic output apparatus 1700 in FIG. 17 are merely illustrative. The acoustic output apparatus may also be an output apparatus with two acoustic drivers, for example, the acoustic output apparatuses shown in FIG. 14 and FIG. 15, that is, the selection conditions for the positions of the microphones (e.g., the microphone 1601 and the microphone 1701) may be also applicable to the acoustic output apparatuses shown in FIG. 14 and FIG. 15.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block," "module," "engine," "unit," "component," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic output apparatus comprising:

at least one acoustic driver, wherein the at least one acoustic driver generates sounds having opposite phases, and the sounds with opposite phases radiate outward from at least two sound guide holes, respectively; and a housing structure configured to carry the at least one acoustic driver and including a user contact surface, wherein when a user wears the acoustic output apparatus, the user contact surface is configured to be in contact with a body of the user, and an included angle between a connection line of the at least two sound guide holes and the user contact surface is in a range of 75° to 90°, wherein the at least two sound guide holes include a first sound guide hole and a second sound guide hole, a distance from the first sound guide hole to the user contact surface is smaller than a distance from the second sound guide hole to the user contact surface, and the distance from the first sound guide hole to the user contact surface is smaller than or equal to 5 mm.

2. The acoustic output apparatus of claim 1, wherein the distance from the first sound guide hole to the user contact surface is smaller than or equal to 2 mm.

3. The acoustic output apparatus of claim 1, wherein a distance between the first sound guide hole and the second sound guide hole is larger than 0 mm and smaller than or equal to 2 mm.

4. The acoustic output apparatus of claim 1, wherein the distance between the first sound guide hole and the second sound guide hole is larger than 0 mm and smaller than or equal to 0.5 mm.

5. The acoustic output apparatus of claim 1, wherein the at least one acoustic driver includes a diaphragm and a magnetic circuit structure, a side of the diaphragm facing away from the magnetic circuit structure forms a front side of the at least one acoustic driver, a side of the magnetic circuit structure facing away from the diaphragm forms a rear side of the at least one acoustic driver, and the diaphragm vibrates to make the at least one acoustic driver radiate sounds outward from the front side and the rear side of the at least one acoustic driver, respectively.

6. The acoustic output apparatus of claim 1, wherein the at least one acoustic driver includes a first acoustic driver and a second acoustic driver, the first acoustic driver includes a first diaphragm, the second acoustic driver includes a second diaphragm, a sound generated by the vibration of the first diaphragm and a sound generated by the vibration of the second diaphragm have opposite phases, and the sounds generated by the vibration of the first diaphragm and the second diaphragm radiate outward from the at least two sound guide holes, respectively.

7. The acoustic output apparatus of claim 1, wherein a damping layer is provided on the at least two sound guide holes.

8. The acoustic output apparatus of claim 7, wherein the damping layer is a metal filter mesh or a gauze mesh.

9. The acoustic output apparatus of claim 5, wherein when the user wears the acoustic output apparatus, the diaphragm faces the ear of the user, and a connection line between the at least two sound guide holes and a central position of a front side of the diaphragm is approximately perpendicular to the face of the user.

10. The acoustic output apparatus of claim 6, wherein the first acoustic driver includes a first magnetic circuit structure, the first diaphragm and the first magnetic circuit structure are sequentially arranged along a vibration direction of the first diaphragm, and a side of the first magnetic circuit structure facing away from the first diaphragm forms a rear side of the first acoustic driver, wherein the first magnetic circuit structure includes a first magnetic conductive plate disposed opposite to the first diaphragm, and the first magnetic conductive plate includes at least one pressure relief hole configured to guide a sound generated by the vibration of the first diaphragm from the rear side of the first acoustic driver.

11. The acoustic output apparatus of claim 6, wherein the second acoustic driver includes a second magnetic circuit structure, the second diaphragm and the second magnetic circuit structure are sequentially arranged along a vibration direction of the second diaphragm, and a side of the second magnetic circuit structure facing away from the second diaphragm forms a rear side of the second acoustic driver, wherein the second magnetic circuit structure includes a second magnetic conductive plate disposed opposite to the second diaphragm, and the second magnetic conductive plate includes at least one pressure relief hole configured to guide a sound generated by the vibration of the second diaphragm from the rear side of the second acoustic driver.

12. The acoustic output apparatus of claim 6, wherein frequency responses of the first acoustic driver and the second acoustic driver are the same or similar at a middle-high-frequency band.

13. The acoustic output apparatus of claim 6, wherein frequency responses of the first acoustic driver and the second acoustic driver are different at a low-frequency band.

14. The acoustic output apparatus of claim 1, wherein an outer surface of the acoustic output apparatus includes a hook, and a shape of the hook matches a shape of an auricle of the user.

15. The acoustic output apparatus of claim 1, further comprising at least one microphone configured to acquire a noise signal from an external environment.

16. The acoustic output apparatus of claim 15, wherein the at least one microphone is disposed on a side wall of the housing structure that is different from a side wall where the at least two sound guide holes are located.

17. The acoustic output apparatus of claim 15, wherein the at least one microphone is disposed in a minimum sound pressure area of the acoustic output apparatus.

18. The acoustic output apparatus of claim 1, wherein the first sound guide hole is disposed on the user contact surface.

19. The acoustic output apparatus of claim 1, wherein the at least two sound guide holes are located on different sides of the housing structure.

20. The acoustic output apparatus of claim 1, wherein the at least two sound guide holes are located on a side of the housing structure that is perpendicular or approximately perpendicular to the user contact surface.

* * * * *